United States Patent [19]

Jestice et al.

[11] 4,053,250

[45] Oct. 11, 1977

[54] LINEAR INDEXER

[75] Inventors: James E. Jestice, Middletown; Robert G. Weatherby, Northfield, both of Ohio

[73] Assignee: Weatherby & Associates, Inc., Middletown, Ohio

[21] Appl. No.: 682,151

[22] Filed: Apr. 30, 1976

[51] Int. Cl.² .......................................... B23B 39/08
[52] U.S. Cl. .......................................... 408/3
[58] Field of Search ....................... 408/3, 4, 5, 6, 12, 408/91, 71

[56] References Cited

U.S. PATENT DOCUMENTS

| | | | |
|---|---|---|---|
| 2,738,692 | 3/1956 | Jones | 408/12 X |
| 2,742,801 | 4/1956 | Opocensky et al. | 408/3 |
| 2,816,465 | 12/1957 | Honnef | 408/3 |
| 2,830,475 | 4/1958 | Jones | 408/3 |
| 2,910,896 | 11/1959 | Gasper | 408/3 |
| 3,040,603 | 6/1962 | Beuton | 408/3 |
| 3,266,343 | 8/1966 | Jellig | 408/3 |
| 3,376,764 | 4/1968 | Schardt | 408/91 X |
| 3,400,615 | 9/1968 | Godlove et al. | 408/3 |
| 3,546,978 | 12/1970 | Keown | 408/3 |
| 3,557,642 | 1/1971 | Schmidt | 408/3 |

*Primary Examiner*—Harrison L. Hinson
*Attorney, Agent, or Firm*—Hamilton, Renner & Kenner

[57] ABSTRACT

Disclosed is a device for accurately indexing a worktable which carries a workpiece thereon upon which work operations are to be performed. The worktable is moved intermittently to successive locations by a pneumatic cylinder under the direction of a program device movable with the worktable. A control device, in its preferred form being a pneumatic logic circuit, reads the program device to actuate the cylinder in accordance with the program, locks the worktable at the desired position, actuates the machine operations, and otherwise directs the entire operation on the workpiece.

24 Claims, 4 Drawing Figures

LINEAR INDEXER

BACKGROUND OF THE INVENTION

This invention relates to a device for indexing a worktable which carries a workpiece theron upon which work operations are to be performed. More specifically, the invention relates to a device for linearly moving a worktable in accordance with instructions provided by a programmable device moving with the worktable.

Accurate positioning of a workpiece for machine tool or other work operations, such as drilling or the like, is highly important. Numerous devices for accomplishing the same exist in the prior art but all have inherent deficiencies. For example, in one type of prior art devices the indexing of the worktable is mechanically controlled by a series of cam operated limit switches which, when tripped, stop the worktable until the machine operation is completed. These types of devices are not highly accurate and are susceptible to problems in that there is usually no means provided to lock the worktable in place once positioned. Further, these machines are not readily programmable so that the same machine can perform a variety of work functions. If, for example, a drilling function were being accomplished and it would be desired to vary the drilling pattern, new stops would have to be programmed into the system necessitating the tearing down and repositioning of the various limit switches.

In an effort to improve the accuracy and versatility lacking in the aforementioned device, a number of computer-like devices have been developed to control workpiece positioning. These devices can be, of course, programmable to improve the versatility of the system and can also provide highly accurate positioning, but are often prohibitively expensive and require the services of highly trained personnel to operate and maintain.

SUMMARY OF THE INVENTION

It is therefore a primary object of the present invention to provide a device for indexing a worktable which is readily programmable to position the worktable at predetermined locations.

It is another object of the invention to provide a device, as above, which provides a means to lock the worktable in place once positioned at the predetermined locations.

It is a further object of the present invention to provide a device, as above, which includes a machine interlock such that the work operations cannot take place unless the worktable is in the predetermined locked location.

It is still another object of the present invention to provide a device, as above, which can move a worktable in two directions.

It is yet another object of the present invention to provide a device, as above, which can move a worktable to provide an offset pattern of machine operations on the workpiece.

It is an additional object of the present invention to provide a device, as above, which is relatively inexpensive and easy to operate and maintain.

These and other objects of the present invention, which will become apparent from the description of the preferred embodiment, are accomplished by the means hereinafter described and claimed.

In general, the device for indexing a worktable carrying a workpiece thereon upon which machine operations are to be performed includes a drive mechanism to move the worktable. The starting and stopping of the drive mechanism is dictated by a programmable device which moves with the worktable. A control system is directed by the programmable device to intermittingly operate the drive mechanism. Means are provided in cooperation with the programmable device to lock the worktable in position when stopped.

DESCRIPTION OF THE PREFERRED EMBODIMENT

Figure 1:
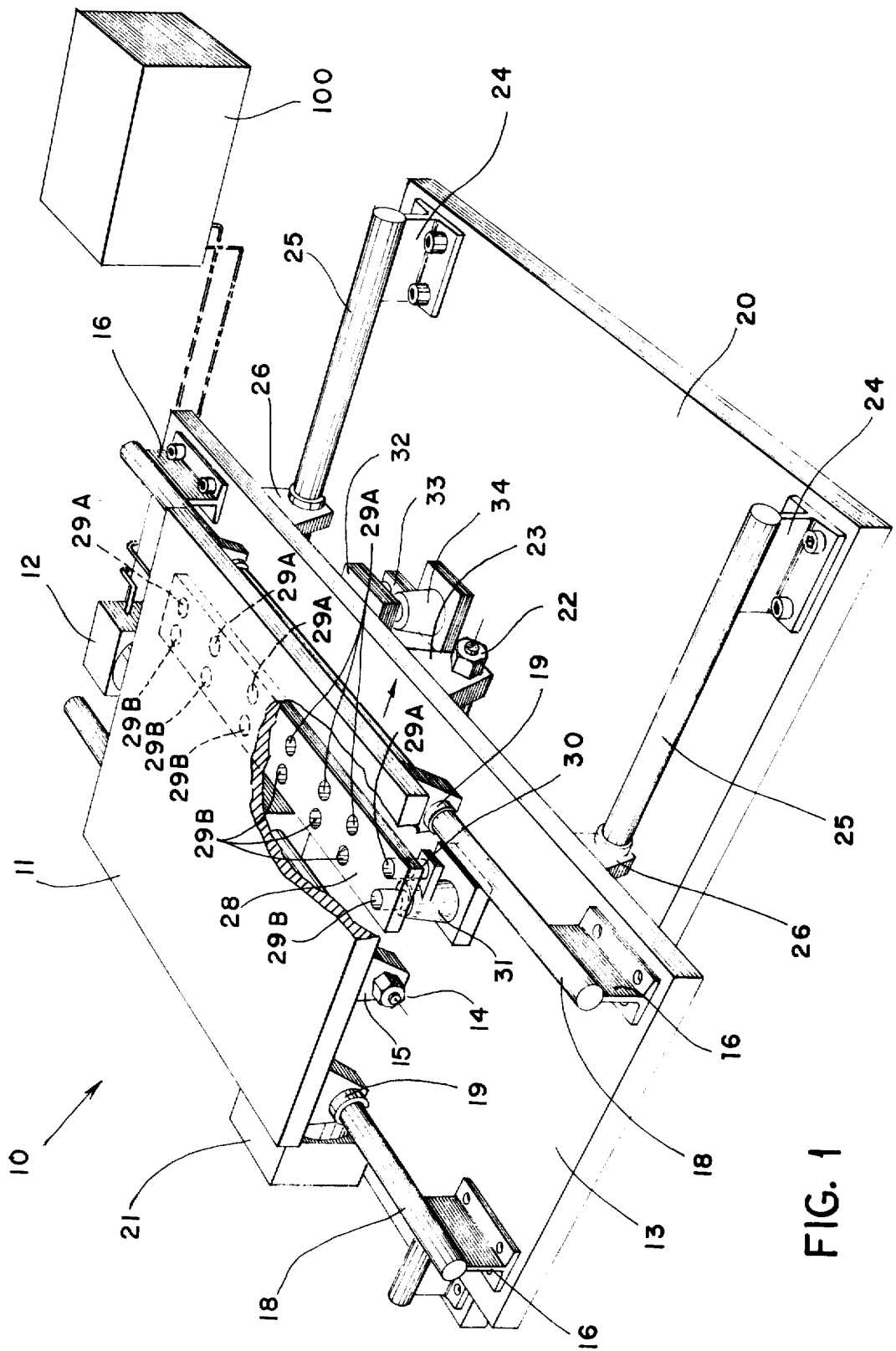
FIG. 1 is a somewhat schematic perspective representation of an indexing device according to the concept of the present invention operating on a worktable for a machine tool and having capabilities of movement in two directions.

A linear indexing device according to the concept of the present invention is shown schemtically in FIG. 1 and indicated generally by the numeral 10. While in its simplest form indexing device 10 could be utilized to move a machine worktable in one direction only, as shown herein, device 10 is utilized to move worktable 11 in two directions 90° of each other. Worktable 11 is capable of holding a workpiece, such as a metallic sheet, thereon and is positioned under any type of machine tool such as a drill press, punch press or the like so that machine or other work operations can be performed in conjunction with the workpiece. Worktable 11 is driven by a hydraulically controlled pneumatic drive cylinder 12 being mounted on an intermediate table base 13 and having its piston rod affixed, as at 14, to a bracket 15 depending from worktable 11. Intermediate table base 13 has a rod support 16 mounted generally at each corner thereof to hold two guide rods 18 extending in the direction of movement of worktable 11. Depending from each corner of worktable 11 is a slide collar 19, two of which move on each rod 18. Thus upon actuation of drive cylinder 12, in a manner to be hereinafter described, worktable 11 moves longitudinally and evenly along rods 18 over intermediate table base 13.

To the extent just described, worktable 11 is capable of movement in one direction, sufficient for many machine operations. If two directional movement is desired, a lower table base 20 can be provided. A second hydraulically controlled pneumatic cylinder 21 is mounted on lower table base 20 to drive worktable 11 and intermediate table base 13 in a lateral direction, that is, transverse to the longitudinal movement of worktable 11 just described. The piston rod of cylinder 21 is affixed, as at 22, to a bracket 23 depending from intermediate table base 13. Like intermediate table base 13, lower table base 20 has a rod support 24 mounted generally at each corner thereof to hold two guide rods 25 extending in a direction lateral to the first longitudinal movement of worktable 11. Depending from each corner of intermediate table base 13 is a slide collar 26, two of which move on each rod 25. Thus, upon actuation of drive cylinder 21, in a manner to be hereinafter described, worktable 11 and intermediate table base 13, as well as all the components fixed thereto such as drive cylinder 12, move laterally and evenly along rods 25 over the fixed lower table base 20.

the movement of worktable 11 in the longitudinal direction is dictated by a program bar 28 which has a plurality of holes 29A and 29B therein. Holes 29 are programmed into bar 28 in a predetermined pattern according to the desired location for work operations to be performed. Thus, in the pattern shown in the representative example of program bar 28 shown in FIG. 1, seven evenly spaced stops are being called for. Holes 29A are located in a position to be sensed or read by a conventional air sensing switch, indicated generally by the numeral 30, while holes 29B are utilized for cooperative interaction with a table locking assembly generally indicated by the numeral 31. Each hole 29A is shown aligned with a hole 29B due to the alignment of air sensing switch 30 and locking assembly 31. However, it is to be understood that were the switch 30 and locking assembly 31 offset longitudinally from each other, holes 29A and 29B would be correspondingly offset.

Movement of worktable 11 in the lateral direction, if desired, can be dictated by a second program bar 32 having a predetermined pattern of holes (not shown) therein for similar utilization by a second air sensing switch 33 and locking assembly 34.

Figure 2:
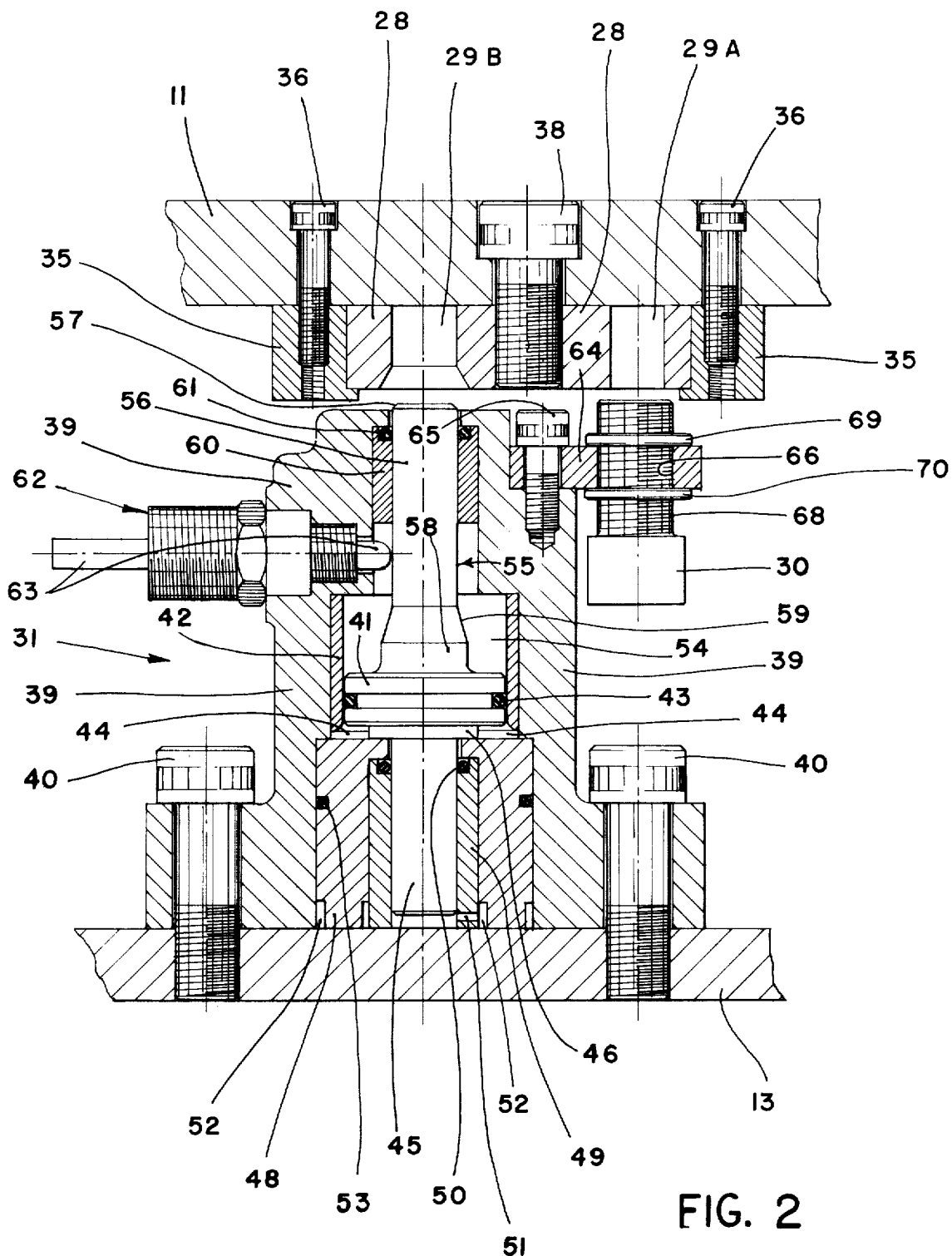
FIG. 2 is a detailed vertical sectional view taken through a locking assembly and sensing switch as well as the worktable and program bar shown schematically in FIG. 1.

The construction and operation of either program bar 28 or 32, sensing switch 30 or 33 and locking assembly 31 of 34 are generally identical and can be understood by merely describing one of the overall assemblies, as shown in FIG. 2. Program bar 28 is mounted for movement with worktable 11 (program bar 32 being mounted for movement with intermediate table base 13). Two longitudinally extending shelves 35 are mounted beneath worktable 11, as by bolts 36. Program bar 28 is readily slidable on shelves 35 for precise positioning below worktable 11 and held in place by bolt 38. Thus, the program bar is quite easily removable and storable merely by unfastening bolt 38 and sliding it out from under worktable 11 for replacement by another program bar in the event a different pattern of work operations is desired.

Lock assembly 31 includes a housing 39 which is mounted on intermediate table base 13 by bolts 40 (lock assembly 33 being mounted on lower table base 20). Housing 39 is formed to hold a piston 41 which rides within bushing 42 with a suitable O-ring seal 43 being provided. Below piston 41 is a chamber 44 which receives air under pressure. Piston rod 45 moves within chamber 44 and has a radially enlarged flange 46 which rests on the upper shoulder of plug member 48. Rod 45 is guided within plug member 48 by bushing 49 with a suitable O-ring seal 50 being provided. Air can be vented through a port 51 in bushing 49 and out through vents 52 in plug member 48. A suitable O-ring seal 53 is provided between plug member 48 and housing 39.

The other side of piston 41 defines chamber 54 within housing 39 through which extends a continuation of a piston rod indicated generally by the numeral 55. Piston rod 55 takes on three configurations, the outermost portion constituting a lock pin 56 of generally constant diameter having a tapered end 57 and the innermost portion being a hub 58 of a larger diameter than lock pin portion 56. A tapered cam surface 59 extends between lock pin 56 and hub 58 of rod 55. Lock pin 56 moves within bushing 60 with a suitable O-ring seal 61 being provided. As piston 41 is forced upward within bushing 42, under the controlled entry of air into chamber 44, the timing of which being hereinafter described, lock pin 56 will move into a hole 29B in lock bar 28 thus holding table 11 in place. A locator pin assembly 62 extends through housing 39 and includes a spring biased pin 63 which is normally urged outward against piston rod 55. As cam surface 59 contacts pin 63 during the upward locking stroke of cylinder 41, the bias on pin 63 is overcome. This provides positive information that the table is locked in place, the use for which being hereinafter described.

In order to conveniently mount air sensing switch 30, a bracket 64 is mounted on housing 39, as by bolt 65. Bracket 64 has a slot 66 therein which is elongated in the longitudinal direction, that is, in the direction of the length of program bar 28. The threaded portion 68 of sensor 30 extends through the slot with sensor 30 being shifted along the elongated slot to obtain precise alignment with a hole 29A. When this longitudinal position is determined, sensor 30 is threaded through flat nut 69 to the desired extent placing the end of threaded section 68 adjacent a hole 29A. The vertical proximity of sensor 30 to holes 29A can thus be adjusted by the thread engagement of flat nut 69 and section 68. Once the desired vertical and longitudinal positions are established, sensor 30 is locked in place by the tightening of flat nut 70. As is well known in the art, sensor 30 provides an air output against the program bar 28. When the program bar moves over the sensor to the point where a hole 29A is aligned with the sensor, a change in back pressure will be detected so that by means of the sensor, the position of the worktable can be detected.

Figure 3:
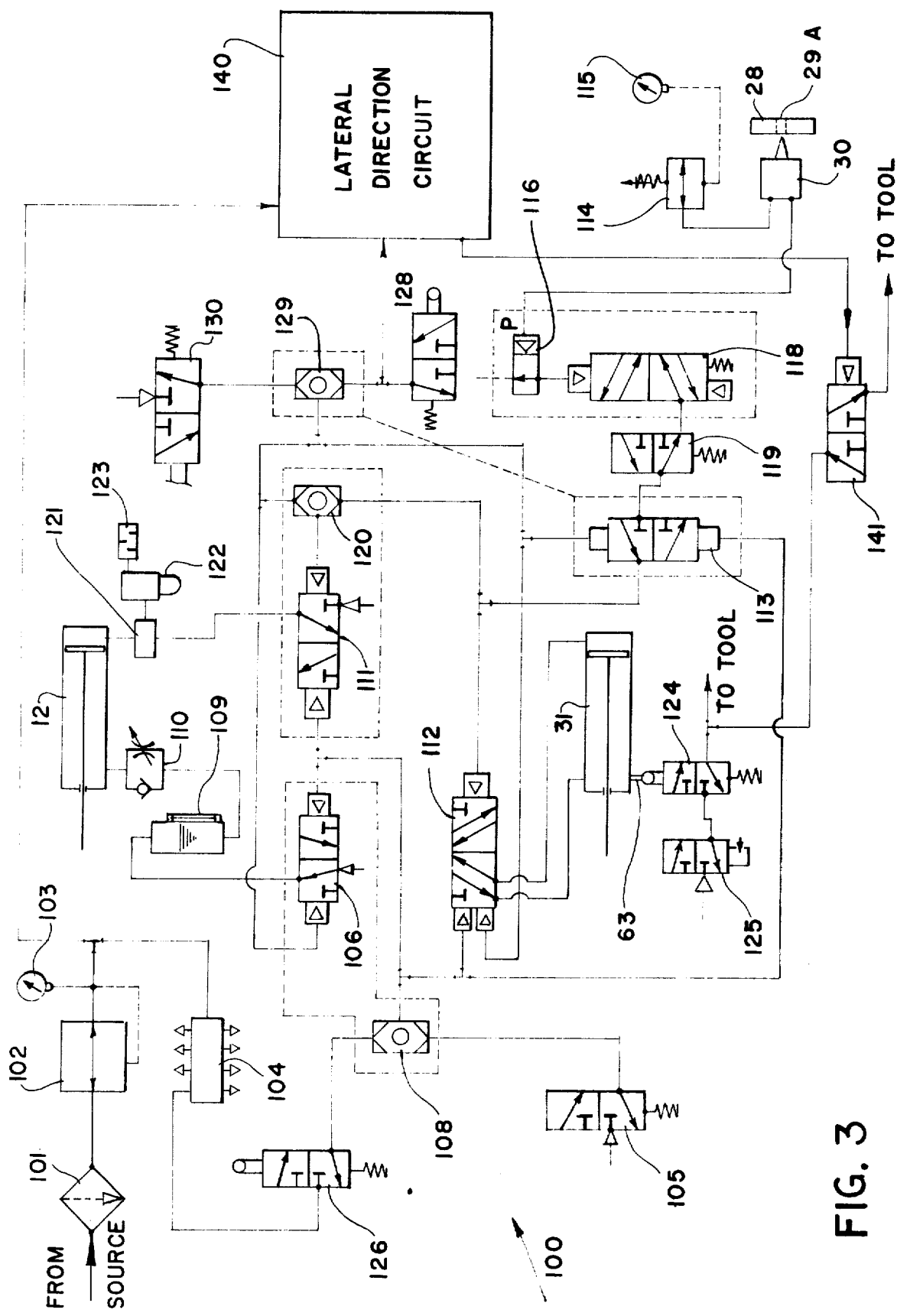
FIG. 3 is a schematic circuit diagram of a pneumatic logic control system according to the concept of the present invention.

The entire operation of the system is coordinated by a control circuit, indicated generally by the numeral 100 in FIG. 1 and shown in its preferred form as a pneumatic logic circuit in FIG. 3. Control circuit 100 coordinates the operation of cylinders 12 and 21 locking mechanisms 31 and 34 and the machine operations as dictated by program bars 28 and 32 read by sensors 30 and 33, respectively. Control circuit 100 includes an air filter 101 which receives air under pressure from a source (not shown), the pressure of which is controlled by a pressure regulator 102 and monitored by a gauge 103. The filtered and regulated air is provided to an air manifold 104 having a plurality of outlets designated by the arrows on manifold 104.

Operation of the indexing device 10 can be initiated by the manual operation of a conventional three way valve 105 which receives air from manifold 104. As is well known in the art, upon actuation a spool within valve 105 shifts in this instance performing four simultaneous functions. First, air is directed to the extend pilot on a three way double air piloted valve 106 through a shuttle valve 108 which is a part of a commercially available package with valve 106. As such, valve 106 and shuttle valve 108 are enclosed in dashed lines in FIG. 3. Providing air to the extend pilot of valve 106 causes it to shift from the position shown in FIG. 3 to take air pressure from the top of an oil tank 109. As previously described, cylinder 12 is a hydraulically controlled pneumatic cylinder. Thus, air is provided to the drive side of the piston of cylinder 12 and oil on the other side of the piston to provide a smooth and well controlled driving movement. With the pressure relieved on tank 109 cylinder 12 can force oil back to tank 109 through a flow control valve and check valve assembly 110.

The actuation of valve 105 also provides air to the extend pilot of another three way double air piloted valve 111 which causes this valve to shift allowing air to enter the back of drive cylinder 12 causing it to move forward to begin moving worktable 11 in the longitudinal direction.

Actuation of valve 105, as a third function, provides air through shuttle valve 108 to the retract pilot on a four way double air piloted valve 112 to provide air to chamber 54 of the locking assembly 31 to assure that lock pin 56 is not engaging a hole 29B of program bar. Finally, actuation of valve 105 provides air to a pilot on a three way double air piloted valve 113 to shift the same to open the supply port to valve 112. For purposes which will hereinafter become evident, valve 113 controls the air to the pilots of valves 111 and 112.

As worktable 11 moves under the control of valve 111, sensor 30 provides an air pressure output of about 5 psi as controlled by pressure regulator 114 and read by gauge 115. When a position stop, that is a hole 29A, has been detected by sensor 30, a small negative pressure is sent back through sensor 30. Sensor 30 then sends a small air pressure to an amplifier 116 associated with a four way double air piloted valve 118. Amplifier 116 converts the small pressure to full line pressure to provide the same to the pilot on valve 118 to shift the same to supply air to an impulse valve 119. Impulse valve 119 provides a pulse or puff of air through previously opened valve 113 to the extend pilot of valve 112 and the stop-retract pilot of valve 111 through its associated shuttle valve 120. This will cause valve 112 to shift and allow air to enter chamber 44 of locking assembly 31 forcing lock pin 56 into a hole 29B, now aligned therewith, and will also cause valve 111 to shift to dump air from the drive side of cylinder 12 through a quick exhaust valve 121. As adjuncts, an air filter 122 may be provided to collect any oil that may bypass the piston of cylinder 12 and exhaust through valve 121, and a muffler 123 can be provided to suppress the noise of the exhausting procedure.

When the locking assembly 31 is actuated, pin 63 will be contacted by cam surface 59. Pin 63 shifts a three way plunger operated valve 124 to supply air to the machine tool head to permit actuation of the same to perform the machine operation. Thus, it is assured that the worktable 11 is locked in place before the machine operation is performed. In the event that manual operation of the machine tool would be desired for any reason, a three way toggle operated valve 125 can be provided to close the air supply directly to the tool effectively bypassing valve 124.

In the automatic sequence, with the tool being controlled by valve 124, when the machine operation is completed and the tool returns to its up position, a three way cam operated valve 126 is shifted providing air from manifold 104 through shuttle valve 108 to reset the circuitry to the original condition as previously described in conjunction with the operation of valve 105. That is, valve 112 is shifted to assure that the program bar 28 is unlocked, valve 113 is opened to be ready for the next pulse from valve 119, air pressure is removed from tank 109, and air pressure is provided to drive cylinder 12 through valve 111 to begin moving cylinder 12 again until the next hole 29A is sensed whereupon the entire procedure is repeated.

When the sequence has progressed through the total program, that is, the last hole 29A having been sensed, cylinder 12 is activated one more time in the usual fashion, but when the worktable reaches the end of its longitudinal movement, a three way cam operated valve 128 is activated. This valve sends air through a shuttle valve 129, associated with valve 113, through shuttle valve 120 and to the retract pilot of valve 111 causing it to shift and dump air from the drive side of cylinder 12. Air is also provided to the retract pilot of valve 106 causing it to shift thereby pressurizing tank 109. Pressurization of tank 109 causes oil to flow into the cylinder 12 forcing it to retract. Air from valve 128 is also provided through shuttle valve 129 to a pilot on valve 113 shifting the same thereby precluding air from passing to the extend pilot on valve 112 so that lock assembly 31 cannot be activated. Finally, valve 128 shifts valve 112 by providing air to its retract pilot allowing air to pass into chamber 54 of locking assembly 31 to disengage the lock pin 56 from the program bar 28. Now as the cylinder retracts, as holes 29A pass by sensor 30, the pulses of air will not activate valve 112 because of the repositioning of valve 113. A manual retract valve 130 can be provided, if desired, to manually retract worktable 11 and otherwise perform the same functions as valve 128.

The circuitry described thus far is capable of operation on a single axis, that is, in what has been referred to as the longitudinal direction. If the workpiece is to have just a single pattern of operations to be performed thereon, such as one line of holes to be drilled therein, as would be the case if a program bar as depicted in FIG. 1 were utilized, then the operation on the particular workpiece would be completed at this point, another workpiece placed on worktable 11, and valve 105 activated to repeat the operation. However, if two axis operation is desired, a lateral direction circuit portion of control circuit 100, shown in block form and indicated by the numeral 140, is activated.

Lateral direction circuit 140 is essentially identical to the portion circuit 100 just described, receiving air from the same source from pressure regulator 102 and activated by air through valve 128. Thus, when the end of the longitudinal travel of the worktable is reached, valve 128 actuates a valve in lateral direction circuit 140 equivalent to valve 105 of circuit 100 to move worktable 11 laterally according to the predetermined pattern established by lateral program bar 32. However, circuit 140 does not have an equivalent to valve 126 which automatically repeats the cycle each time the tool is retracted. Thus, when sensor 33 detects the first hole in bar 32, the longitudinal control portion of circuit 100 again takes over to repeat the pattern of work stops programmed in bar 28. If bar 32 were identical to the seven stop program bar 28 shown in FIG. 1, then a total program of a seven by seven square pattern would be called for.

In the two axis operation it is also necessary to provide a pilot operated three-way valve 141 for actuation of the tool. Valve 141 would be connected between valve 124 and its equivalent valve in lateral direction circuit 140 which would assure that the lock pins of both locking assemblies 31, 34 were in place prior to activation of the tool.

Figure 4:
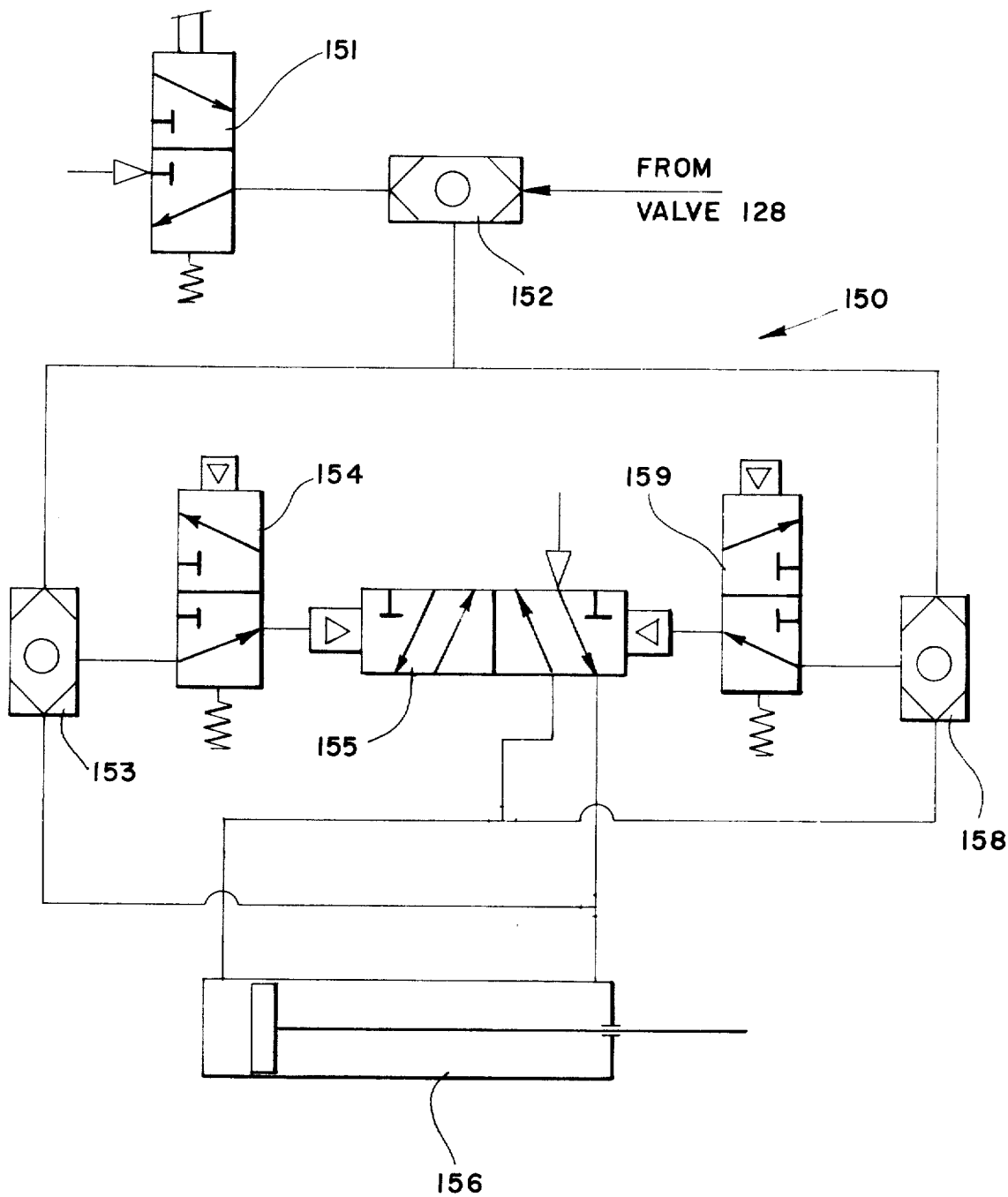
FIG. 4 is a schematic circuit diagram of an adjunct to the circuit of FIG. 3 utilized when an offset pattern of work is to be done on the workpiece.

In the event that an offset pattern of work were desired instead of the uniform square pattern, described above, a pattern offset circuit, indicated generally by the numeral 150 and shown in FIG. 4, can be added to the two axis circuit of FIG. 3. In order to create what is herein called an "offset" pattern, the longitudinal row of work stops would be shifted longitudinally every alternate lateral stop. Such shifting could, for example, be equivalent to half the spacing between two longitudinal stops such that the net result of the total work pattern resembles the pattern defined by one of the colors on a checkerboard.

In order to accomplish this type of offset, it is necessary to shift the workpiece on worktable 11 longitudinally by a distance equal to half the distance between longitudinal stops. Assuming the first row of work functions were accomplished with the normal pattern, then before operating in the second longitudinal row, a shift would occur, with a similar reverse shift occurring prior to operation in the third row, etc. The initiation of such a shift could be dictated automatically at the end of each row by a signal from valve 128 or could be accomplished manually by operation of a three-way manually operated valve 151. In either event, the initiating signal is transmitted through a shuttle valve 152 and for purposes of this example through another shuttle valve 153 to an impulse valve 154. The signal to impulse valve 154 shifts a four-way double air piloted valve 155 to send air into the rear of a pneumatic cylinder 156 and to a shuttle valve 158 to shift it to the open position. Cylinder 156 can be mounted such that it shifts the workpiece a predetermined extent dependent on the amount of offset desired. During the forward stroke of cylinder 156, air escaping from the front causes a shuttle valve 153 to shift to the closed position. At this point the offset has been created and normal operation of circuit 100 will move worktable 11 longitudinally to create the offset pattern. When the device is ready to make its next longitudinal pass, the next signal through shuttle valve 152 passes through shuttle 158, open from the last pass, to another impulse valve 159 to shift valve 155 back to its original position sending air to the front of cylinder 156 moving it back to its original position. Air is also directed to open shuttle valve 153. Air escaping fro the rear of cylinder 156 causes shuttle valve 158 to shift to its closed position. Thus, each time an air signal is passed through shuttle valve 152, cylinder 156 will move in the opposite direction thereby effecting the offset pattern.

It should thus be evident that a device constructed and operated according to the description herein accomplishes the objects of the present invention and otherwise substantially improves the indexing art.

We claim:

1. Apparatus for indexing a worktable carrying a workpiece upon which work operations are to be performed comprising, drive means to translate the worktable, program means movable with the worktable and dictating predetermined locations at which the worktable will stop for operations on the workpiece, lock means cooperatively interacting with said program means to hold the worktable at the predetermined locations, and control means directed by said program means to intermittently operate said drive means to position the worktable at the predetermined locations.

2. Apparatus according to claim 1 wherein said program means is a bar affixed to the worktable.

3. Apparatus according to clai 2 wherein a plurality of holes in said bar dictate the predetermined locations at which the worktable will stop for operations on the workpiece.

4. Apparatus according to claim 3 further comprising means to monitor the position of the worktable by sensing said holes and providing an output signal to said control means.

5. Apparatus according to claim 4 wherein said bar has a second plurality of holes therein and said lock mans includes pin means extendable into a said hole of said second plurality of holes when directed to do so by said control means.

6. Apparatus according to claim 1 wherein said control means is a pneumatic logic circuit.

7. Apparatus according to claim 1 wherein said drive means is a cylinder having a piston therein, said piston being exposed to air pressure on one side thereof and oil pressure on the other side thereof.

8. Apparatus according to claim 7 wherein said control means includes means to apply air pressure on said one side of said piston and to relieve pressure on said other side of said piston to translate the worktable.

9. Apparatus according to claim 1 further comprising sensing means reading said program means to determine the position of the worktable and provide an output signal to said control means when a predetermined location is reached.

10. Apparatus according to claim 9 wherein said control means includes means receiving the signal from said sensing means to stop said drive means and activate said lock means.

11. Apparatus according to claim 1 wherein said lock means includes means to indicate whether said worktable is locked in place.

12. Apparatus according to claim 11 wherein said control means includes means to actuate the work operation if said means to indicate indicates that the worktable is locked in place.

13. Apparatus according to claim 11 wherein said control means includes means to prohibit activation of said drive means if said means to indicate indicates that the worktable is locked in place.

14. Apparatus according to claim 1 wherein said control means includes means to reverse the movement of said drive means upon completion of the cycle of predetermined stop locations.

15. Apparatus according to claim 14 wherein said control means further includes means to override the activation of said lock means during operation of said means to reverse.

16. Apparatus according to claim 1 wherein said program means has a plurality of holes therein and said lock means includes pin means selectively movable into said holes to hold the worktable at the predetermined locations.

17. Apparatus according to claim 16 wherein said lock means further includes a piston and piston rod, one end of said piston rod forming said pin means.

18. Apparatus according to claim 17 wherein said piston rod has a tapered surface between said pin means and said piston, said lock means further comprising means contacting said tapered surface to monitor the position of said pin means.

19. Apparatus according to claim 1 wherein said drive means translates the worktable in a first direction and further comprising second drive means to translate the worktable in a second direction, second program mans movable with the worktable in the second direction and dictating predetermined locations at which the worktable will stop in the second direction, and second lock means cooperatively interacting with said second program means to hold the worktable at the predetermined locations in the second direction, said control means also being directed by said second program means to intermittently operate said second drive means to position the worktable at the predetermined locations.

20. Apparatus according to claim 19 further comprising second sensing means reading said second program means to determine the position of the worktable and provide an output signal to said control means when a predetermined location in the second direction is reached.

21. Apparatus according to claim 19 wherein said second drive means translates said drive means and said lock means in said second direction.

22. Apparatus according to claim 19 further comprising means to shift the workpiece in said first direction after movement in said second direction.

23. Apparatus according to claim 19 wherein said lock means and said second lock means includes means to indicate whether said worktable is locked in place.

24. Apparatus according to claim 23 wherein said control means includes means to actuate the work operation if said means to indicate whether the worktable is locked in place of both said lock means indicates that the worktable is locked in place.

* * * * *